(12) United States Patent
Shimizu et al.

(10) Patent No.: US 7,001,297 B2
(45) Date of Patent: Feb. 21, 2006

(54) HYBRID TRANSMISSION

(75) Inventors: Hirofumi Shimizu, Kanagawa (JP); Masaki Nakano, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/686,585

(22) Filed: Oct. 17, 2003

(65) Prior Publication Data
US 2004/0097317 A1   May 20, 2004

(30) Foreign Application Priority Data
Nov. 14, 2002 (JP) ............................ 2002-330799
Nov. 14, 2002 (JP) ............................ 2002-330830

(51) Int. Cl.
  *F16H 3/72* (2006.01)
  *H02K 17/44* (2006.01)
(52) U.S. Cl. .......................................... 475/5; 310/112
(58) Field of Classification Search ................. 475/5; 310/75 D, 112–4, 52, 54
  See application file for complete search history.

(56) References Cited
U.S. PATENT DOCUMENTS
5,424,593 A * 6/1995 Vaghani et al. ............. 310/114
6,380,653 B1 * 4/2002 Seguchi ...................... 310/112
6,732,526 B1 * 5/2004 Minagawa et al. ............. 475/5
2003/0064847 A1 * 4/2003 Oshidari et al. ............... 475/5
2003/0069104 A1 * 4/2003 Nakano et al. ................. 475/5
2003/0224892 A1 * 12/2003 Yamauchi et al. ............. 475/5
2004/0097315 A1   5/2004 Shimizu et al.

FOREIGN PATENT DOCUMENTS
JP    4-364343 A       12/1992
JP    11041861 A    *   2/1999
JP    2000-14081 A      1/2000
JP    2000-203289 A     7/2000

* cited by examiner

*Primary Examiner*—Roger Pang
(74) *Attorney, Agent, or Firm*—Foley and Lardner (57) ABSTRACT

A hollow inner rotor shaft is connected with an inner rotor of a motor/generator unit and extends toward a differential speed change unit to be operatively connected to the same. An outer rotor shaft is rotatably received in the hollow inner rotor shaft and extends to the differential speed change unit to be operatively connected to the same. The outer rotor shaft is connected to the outer rotor through a circular drive plate which is positioned at one axial end of the motor/generator unit that is opposite to the other axial end that faces the differential speed change unit. An outer rotor assembly which substantially consists of the outer rotor, the circular drive plate and the outer rotor shaft is rotatably supported in the housing by means of at least three supporting members.

10 Claims, 4 Drawing Sheets

HYBRID TRANSMISSION

BACKGROUND OF THE INVENTION

1. Field of the Invention

The present invention relates in general to a hybrid transmission for wheeled motor vehicles, and more particularly to a two-rotor type motor/generator unit that constitutes an essential part of the hybrid transmission. More specifically, the present invention is concerned with a supporting structure for rotatably supporting an outer rotor or outer rotor assembly of the motor/generator unit relative to a housing.

2. Description of the Related Art

In order to clarify the task of the present invention, a hybrid transmission and a two-rotor type motor/generator unit of the hybrid transmission to which the present invention is practically applied will be briefly described in the following.

The hybrid transmission generally comprises a housing, a differential speed change unit installed in the housing and a two-rotor type motor/generator unit installed in the housing in a manner to be coaxial with the speed change unit. Upon mounting on a motor vehicle, the hybrid transmission is positioned beside an engine (viz., internal combustion engine) in such an arrangement that speed change unit is placed between the motor/generator unit and the engine.

The two-rotor type motor/generator unit generally comprises inner and outer rotors that rotate about a common axis in and around a fixed annular stator respectively. Inner and outer rotor shafts are concentrically arranged about the common axis and extend from the inner and outer rotors to the speed change unit to be operatively connected to the same. The inner rotor shaft is a hollow member and the outer rotor shaft is rotatably received in the inner rotor shaft. The inner rotor shaft has an axially outside end portion tightly engaged with an inner cylindrical wall of the inner rotor, so that the inner rotor shaft and the inner rotor rotate like a single unit.

The outer rotor shaft received in the hollow inner rotor shaft has an axially outside end that is connected to an outside end of the outer rotor through a circular drive plate, so that the outer rotor shaft, the drive plate and the outer rotor rotate like a single unit. More particularly, the circular drive plate is positioned at an axially outside end of the motor/generator unit that is opposite to an axially inside end of the same that faces the speed change unit. That is, the outer rotor is connected to the speed change unit through a so-called "turn-around power transmission structure".

SUMMARY OF THE INVENTION

Usually, for rotatably supporting a rotor of an ordinary electric motor, two bearings are used which are arranged to bear axial ends of the rotor respectively. One of such supporting structures is shown in Japanese Laid-open Patent Application (Tokkaihei) 4-364343. In the supporting structure of this publication, the two bearings bearing the axial ends of the rotor are supported by a casing of the motor.

As is easily understood, however, due to obstruction by the turn-around power transmission structure, the supporting structure disclosed by the publication can not be directly applied to the outer rotor of the above-mentioned motor/generator unit.

It is therefore an object of the present invention to provide a hybrid transmission that has an improved supporting structure for an outer rotor or outer rotor assembly of a two-rotor type motor/generator unit.

It is another object of the present invention to provide a hybrid transmission of which axial length is sufficiently shortened.

It is still another object of the present invention to provide a hybrid transmission that has a sufficiently shortened wiring for the two-rotor type motor/generator unit.

According to a first aspect of the present invention, there is provided a hybrid transmission which comprises a housing having a common axis defined thereby, the housing being adapted to be positioned beside an engine when the hybrid transmission is mounted on a motor vehicle; a differential speed change unit installed in the housing at a position near the engine and arranged coaxial with the common axis; a two-rotor type motor/generator unit installed in the housing at a position away from the engine and arranged coaxial with the common axis, the motor/generator unit having inner and outer rotors; an inner rotor shaft connected with the inner rotor to rotate therewith, the inner rotor shaft being hollow and coaxial with the common axis and extending to the differential speed change unit to be operatively connected to the same; and an outer rotor shaft rotatably received in the hollow inner rotor shaft and extending to the differential speed change unit to be operatively connected to the same, the outer rotor shaft being connected to the outer rotor through a circular drive plate which is positioned at one axial end of the motor/generator unit that is opposite to the other axial end that faces the differential speed change unit, wherein an outer rotor assembly substantially consisting of the outer rotor, the circular drive plate and the outer rotor shaft is rotatably supported in the housing by means of at least three supporting members.

According to a second aspect of the present invention, there is provided a hybrid transmission which comprises a housing having a common axis defined thereby, the housing being adapted to be positioned beside an engine when the hybrid transmission is mounted on a motor vehicle; a differential speed change unit installed in the housing at a position near the engine and arranged coaxial with the common axis; a two-rotor type motor/generator unit installed in the housing at a position away from the engine and arranged coaxial with the common axis, the motor/generator unit having inner and outer rotors and a wiring; an inner rotor shaft connected with the inner rotor to rotate therewith, the inner rotor shaft being hollow and coaxial with the common axis and extending to the differential speed change unit to be operatively connected to the same; and an outer rotor shaft rotatably received in the hollow inner rotor shaft and extending to the differential speed change unit to be operatively connected to the same, the outer rotor shaft being connected to the outer rotor through a circular drive plate which is positioned at one axial end of the motor/generator unit that is opposite to the other axial end that faces the differential speed change unit, wherein an outer rotor assembly substantially consisting of the outer rotor, the circular drive plate and the outer rotor shaft is rotatably supported in the housing by means of three supporting members, and wherein a structurally larger part of the outer rotor assembly which substantially consists of the outer rotor and the circular drive plate is rotatably supported by two of the supporting members, and a structurally smaller center part of the outer rotor assembly which substantially consists of the outer rotor shaft is rotatably supported by the remaining one of the supporting members.

According to a third aspect of the present invention, there is provided a hybrid transmission which comprises a housing having a common axis defined thereby, the housing being adapted to be positioned beside an engine when the hybrid transmission is mounted on a motor vehicle, the housing having a diametrically reduced portion by which the housing is divided into a first housing part which is positioned near the engine and a second housing part which is positioned away from the engine; a differential speed change unit installed in the first housing part and arranged coaxial with the common axis; a two-rotor type motor/generator unit installed in the second housing part and arranged coaxial with the common axis, the motor/generator unit having inner and outer rotors and a wiring; an inner rotor shaft connected with the inner rotor to rotate therewith, the inner rotor shaft being hollow and coaxial with the common axis and extending to the differential speed change unit to be operatively connected to the same; and an outer rotor shaft rotatably received in the hollow inner rotor shaft and extending to the differential speed change unit to be operatively connected to the same, the outer rotor shaft being connected to the outer rotor through a circular drive plate which is positioned at one axial end of the motor/generator unit that is opposite to the other axial end that faces the differential speed change unit, wherein an outer rotor assembly substantially consisting of the outer rotor, the circular drive plate and the outer rotor shaft is rotatably supported in the housing by means of at least three supporting members, and wherein the wiring of the motor/generator unit is exposed to a space between the differential speed change unit and the motor/generator unit and led and exposed to the outside of the housing through an opening formed in the diametrically reduced portion of the housing.

DETAILED DESCRIPTION OF THE INVENTION

In the following, a hybrid transmission of the present invention will be described in detail with the aid of the accompanying drawings.

For ease of description, various directional terms, such as, right, left, upper, lower, rightward and the like, are used in the following description. However, such terms are to be understood with respect to a drawing or drawings on which the corresponding part or portion is shown.

Figure 1:
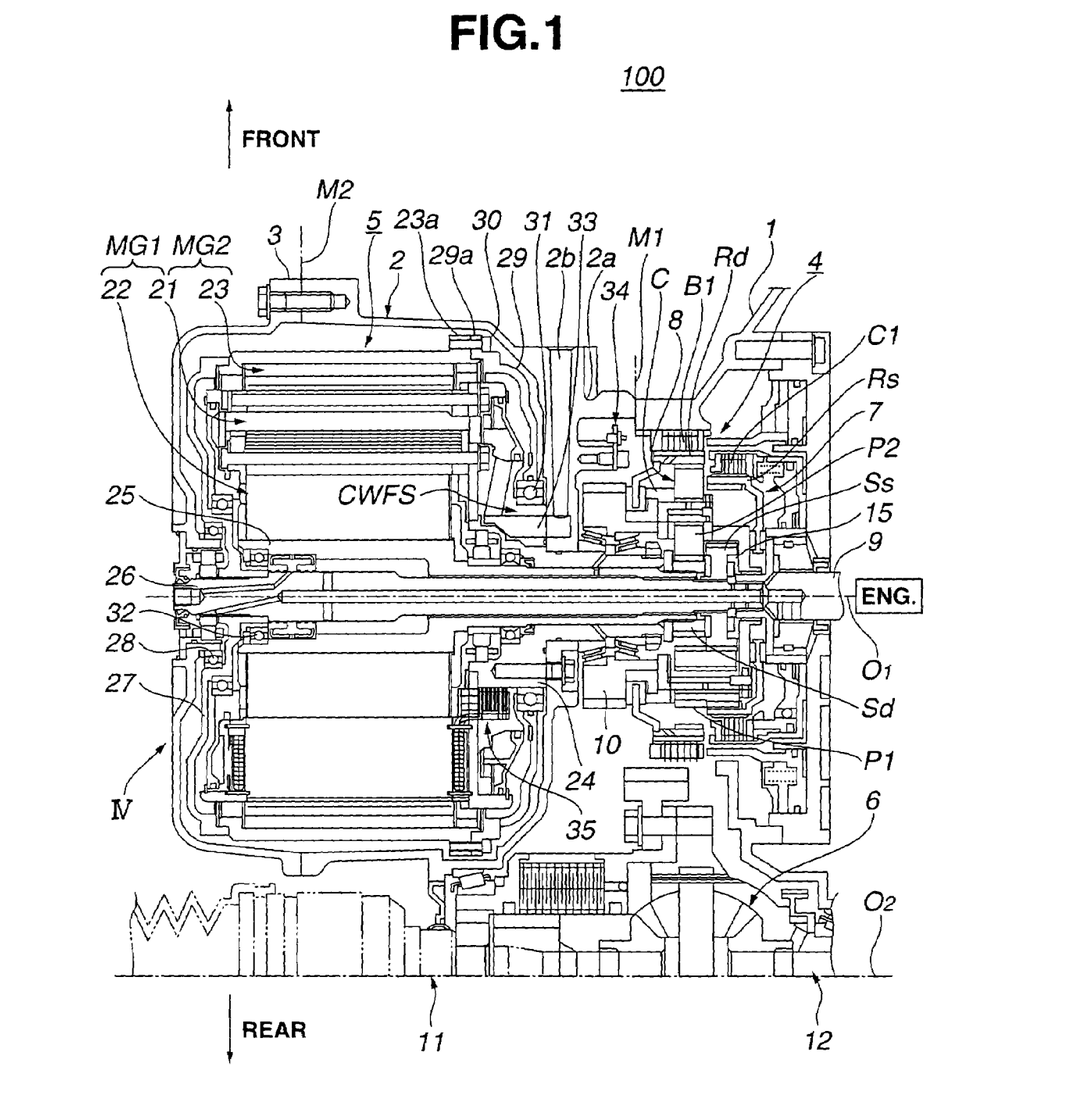
FIG. 1 is an axially sectional view of a hybrid transmission of the present invention, which is taken along a plane.

Referring to FIG. 1, there is shown, but in a sectional manner, a hybrid transmission 100 according to the present invention.

Hybrid transmission 100 shown is an example that is used as a transaxle for a FF (viz., front engine front drive) type motor vehicle. Thus, in FIG. 1, a transversely mounted engine ENG is positioned at a right side of hybrid transmission 100. That is, in the drawing, upper, lower, left and right sides indicate front, rear, left and right parts of an associated motor vehicle, respectively.

As shown in FIG. 1, transmission 100 comprises a housing (1, 2, 3) that includes a right housing part 1, a center housing part 2 and a left housing part 3 which are combined together by bolts.

As shown, right and center housing parts 1 and 2 are coupled at a first split section M1, and center and left housing parts 2 and 3 are coupled at a second split section M2. The sprit section M1 or M2 is the part where respective facing edges of two housing parts 1 and 2 (or, 2 and 3) intimately contact each other. More specifically, each sprit section M1 or M2 is a split part where the housing is dividable into two housing parts 1 and 2 (or, 2 and 3).

Upon assembly on a vehicle, an engine (viz., internal combustion engine) ENG is placed on a right side of the hybrid transmission 100 in FIG. 1, as is described hereinabove.

In a right part of the transmission housing, that is, in a part defined by right and center housing parts 1 and 2, there is installed a differential speed change unit 4 which includes a ravigneawx type planetary gear set. While, in a left part of the transmission housing, that is, in a part defined by center and left housing parts 2 and 3, there is installed a two-rotor type motor/generator unit 5. The unit 5 is, for example, a combined current double layer winding motor.

These differential speed change unit 4 and motor/generator unit 5 are coaxially arranged on a common axis $O_1$ of the transmission housing. Beside the axis $O_1$, a countershaft (not shown) is arranged which is installed in the housing and extends in parallel with the axis $O_1$. Furthermore, beside the axis $O_1$, another axis $O_2$ extends in parallel with the axis $O_1$, about which a differential gear unit 6 is arranged.

Differential speed change unit 4 generally comprises first and second planetary gear units 7 and 8 which use long pinions P1 in common. First planetary gear unit 7 generally comprises a sun gear Ss, a ring gear Rs and long pinions P1 which are meshed with both sun gear Ss and ring gear Rs. Second planetary gear unit 8 generally comprises a sun gear Sd, a ring gear Rd, long pinions P1 and larger diameter short pinions P2. Short pinions P2 are meshed with both sun gear Sd and ring gear Rd and meshed with long pinions P1.

In differential speed change unit 4, ring gear Rd, short pinions P2, long pinions P1 and sun gear Ss constitute a so-called double pinion planetary gear unit, and all of short and long pinions P2 and P2 are rotatably carried by a common pinion carrier C.

Differential speed change unit 4 having the above-mentioned ravigneawx type planetary gear set installed therein uses four major rotation members (viz., sun gear Ss, sun gear Sd, ring gear Rs and pinion carrier C) as main elements for serving as a two-freedom type differential speed change unit in which when determining the rotation speed of two of the four rotation members, the rotation speed of the other two rotation members is automatically determined.

Around ring gear Rs, there is arranged a clutch C1 through which a rotation of an input shaft 9 is inputted to ring gear Rs. Input shaft 9 is powered by engine ENG. Pinion carrier C is connected via spline connection to an output gear 10 that is arranged between differential speed change unit 4 and motor/generator unit 5.

Between output gear 10 and differential gear unit 6, there are arranged gears that are disposed on the above-mentioned countershaft (not shown), through which a torque of output gear 10 is transmitted to differential gear unit 6 and then to drive shafts 11 and 12 of steered front left and front right drive road wheels (not shown).

Motor/generator unit 5 generally comprises an annular stator 21 that has electromagnets mounted thereon, an inner rotor 22 that has permanent magnets embedded therein and is concentrically rotatable in annular stator 21 and an outer rotor 23 that has permanent magnets embedded therein and is concentrically rotatable around annular stator 21. Thus, inner rotor 22, annular stator 21 and outer rotor 23 constitute a triple layered cylindrical structure. Motor/generator unit 5 having the above-mentioned structure is installed in the space defined by center housing part 2 and left housing part 3, as has been mentioned hereinabove.

As is seen from FIG. 1, annular stator 21 and inner rotor 22 constitute a first motor/generator unit section MG1, and annular stator 21 and outer rotor 23 constitute a second motor/generator unit section MG2. Thus, first motor/generator unit section MG1 is arranged to be enclosed by second motor/generator unit section MG2.

Each of unit sections MG1 and MG2 has two functions, one being a motor function wherein when fed with a combined current, it produces rotation of rotor 22 or 23 with a rotation speed and a rotation direction which are both determined by the characteristic of the current, and the other being a generator function wherein when applied with a kinetic power through rotor 22 or 23, it generates an electric power of which characteristic is determined by rotation speed of rotor 22 or 23.

For installing motor/generator unit 5 in its given space defined by center and left housing parts 2 and 3, the following measures are employed in the invention.

As is seen from FIG. 1, a bearing holder 24 is fixed by bolts to a wall portion of center housing part 2. Axially right end of annular stator 21 is fixed to bearing holder 24, so that annular stator 21 is tightly held by the transmission housing.

A hollow inner rotor shaft 25 is tightly engaged at its left enlarged part with a cylindrical inner wall of inner rotor 22, and a front slim part of the shaft 25 is passed through a center opening of bearing holder 24 and projected rightward to right housing part 1 to be operatively engaged with sun gear Sd.

In hollow inner rotor shaft 25, there is inserted an outer rotor shaft 26 that is rotatable relative to inner rotor shaft 25. Outer rotor shaft 26 has a right slim part projected rightward from an front open end of inner rotor shaft 25 to be operatively engaged with the other sun gear Ss.

As shown, the projected end of the right slim part of outer rotor shaft 26 is rotatably supported by right housing part 1 through a bush 15.

To a left end of outer rotor 23, there is connected a peripheral portion of circular drive plate 27. A center opening of drive plate 27 is connected to a left end portion of outer rotor shaft 26 through a spline connection, so that outer rotor 23, drive plate 27 and outer rotor shaft 26 rotate together about the axis $O_1$ like a single unit. That is, outer rotor 23 is operatively connected to speed change unit 4 through a so-called turn-around power transmission structure. If desired, outer rotor 23 and circular drive plate 27 may be of an integral or one-block or structure.

A radially inner part of drive plate 27 is rotatably supported by left housing part 3 through a bearing 28, so that drive plate 27 serves as a supporter for the left part of outer rotor 23.

Figure 4:
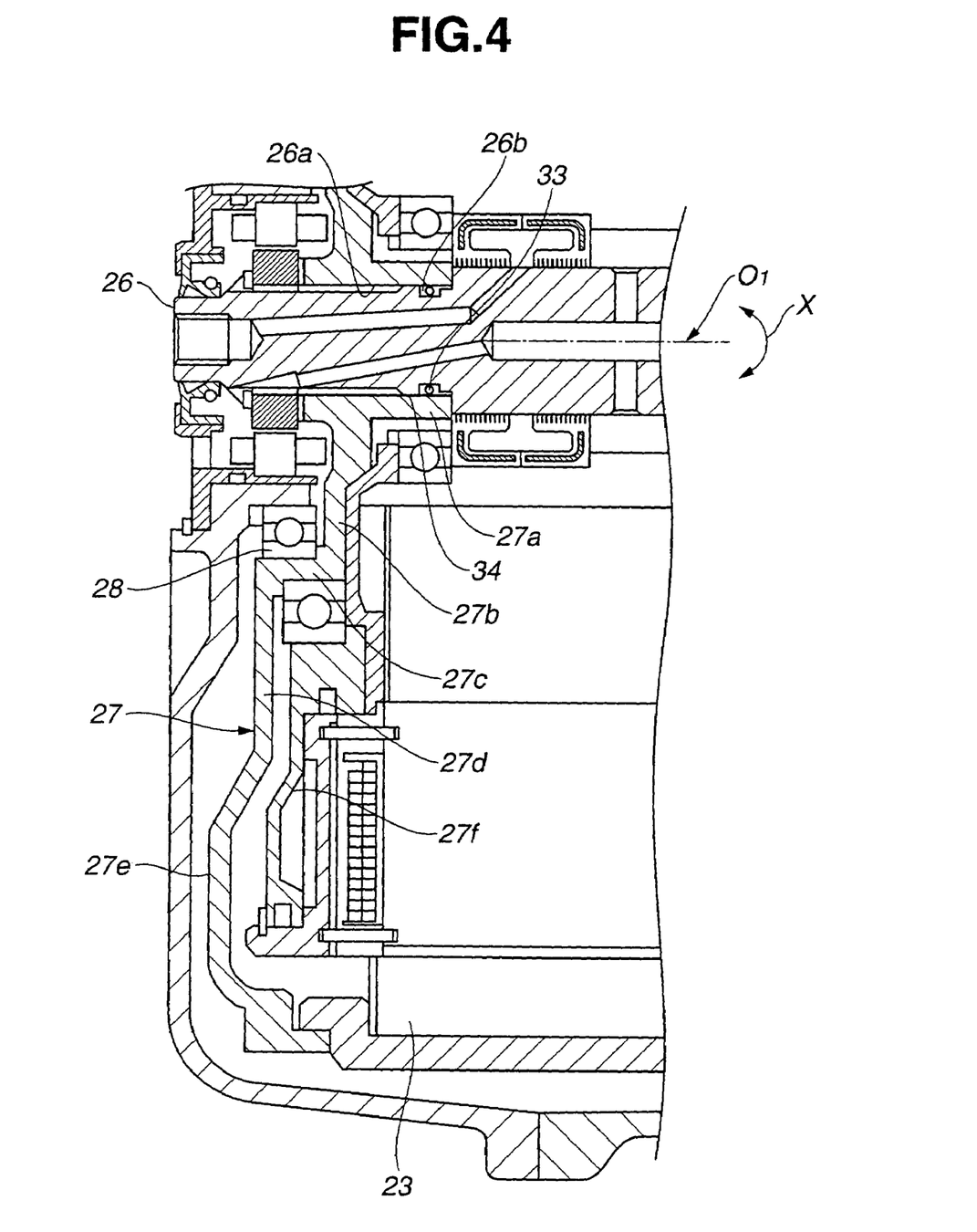
FIG. 4 is an enlarged view of the part indicated by an arrow "IV" of FIG. 1.

As is well shown in FIG. 4, circular drive plate 27 comprises a cylindrical hub portion 27a that is disposed about a splined left end portion 26a outer rotor shaft 26 through the spline connection, an inner annular portion 27b that radially outward extends from hub portion 27a, a stepped annular portion 27c that projects leftward from a peripheral part of inner annular portion 27b, a center annular portion 27d that radially outward extends from a left end of the stepped annular portion 27c and an outer annular portion 27e that radially outward extends from a peripheral part of the center annular portion 27d through an inclined annular portion 27f. As shown, a peripheral part of outer annular portion 27e is secured to the left end of outer rotor 23. Stepped annular portion 27c disposed on bearing 28.

As is seen from this drawing, a radially inner part of circular drive plate 27, that is, the part including hub portion 27a, inner annular portion 27b and stepped annular portion 27c, has a zigzag cross section. With this zigzag form in cross section of the radially inner part of circular drive plate 27, outer rotor shaft 26 is permitted to make a small swing about the axially left end thereof as is indicated by an arrow X, during rotation of outer rotor 23. That is, the zigzag structure constitutes a so-called swing permission means.

In addition to the swing permission means, a swing promotion means is further possessed by outer rotor shaft 26 and circular drive plate 27, which is as follows.

As is seen in FIG. 4, the splined left end portion 26a of outer rotor shaft 26 is reduced in diameter and operatively received in a splined inner surface of cylindrical hub portion 27a of circular drive plate 27. The left end portion 26a of outer rotor shaft 26 is formed, near the right end of cylindrical hub portion 27a, with an annular groove 26b in which an O-ring 33 is received.

Denoted by numeral 34A is an annular ridge of the left end portion 26a, that is defined between the splined portion 26a and annular groove 26b. As shown, annular ridge 34A has a reduced top surface which is in intimate contact with the cylindrical inner surface of the hub portion 27a of circular drive plate 27 to serve as a fulcrum of outer rotor shaft 26. The reduced top surface of annular ridge 34A is rounded at its axial ends. Thus, annular ridge 34A can serve serves as a swing promotion means of outer rotor shaft 26.

Referring back to FIG. 1, to a right end of outer rotor 23, there is connected a circular end plate 29. For this connection, a peripheral flange 29a of end plate 29 and a peripheral flange 23a of outer rotor 23 are put together and tightly connected by bolts 30. With this, end plate 29 is tightly connected to the right end of outer rotor 23 to rotate together. A radially inner part of end plate 29 is rotatably supported by bearing holder 24 of center housing part 2 through a bearing 31, so that end plate 29 serves as a supporter for the right end of outer rotor 23.

Between the radially inner part of circular drive plate 27 and the left end portion of inner rotor shaft 25, there is operatively interposed a bearing 32, so that the left end of inner rotor 22 is rotatably supported by left housing part 3 through inner rotor shaft 25.

A cooling water flow structure CWFS for cooling annular stator 21 comprises cooling water passages 2b formed in the wall portion of center housing part 2 and a cooling water passage 33 formed in bearing holder 24.

It is to be noted that the cooling water flow structure CWFS and a wiring 34 of the electromagnets of annular stator 21 are each arranged at a position between differential speed change unit 4 and motor/generator unit 5. With this arrangement, an axial length of the transmission housing (1+2+3) can be reduced because the axial left end of the housing has no need of providing a structure through which wiring 34 is exposed to the outside of the housing. In the transmission of the above-mentioned Japanese Laid-Open Patent Application 2000-014081, such structure is provided on the axial left end of the transmission housing. Thus, in the present invention, steered front left and right drive road wheels incorporated with drive shafts 11 and 12 can have a larger steerage angle due to the compact construction of the transmission housing.

Figure 2:
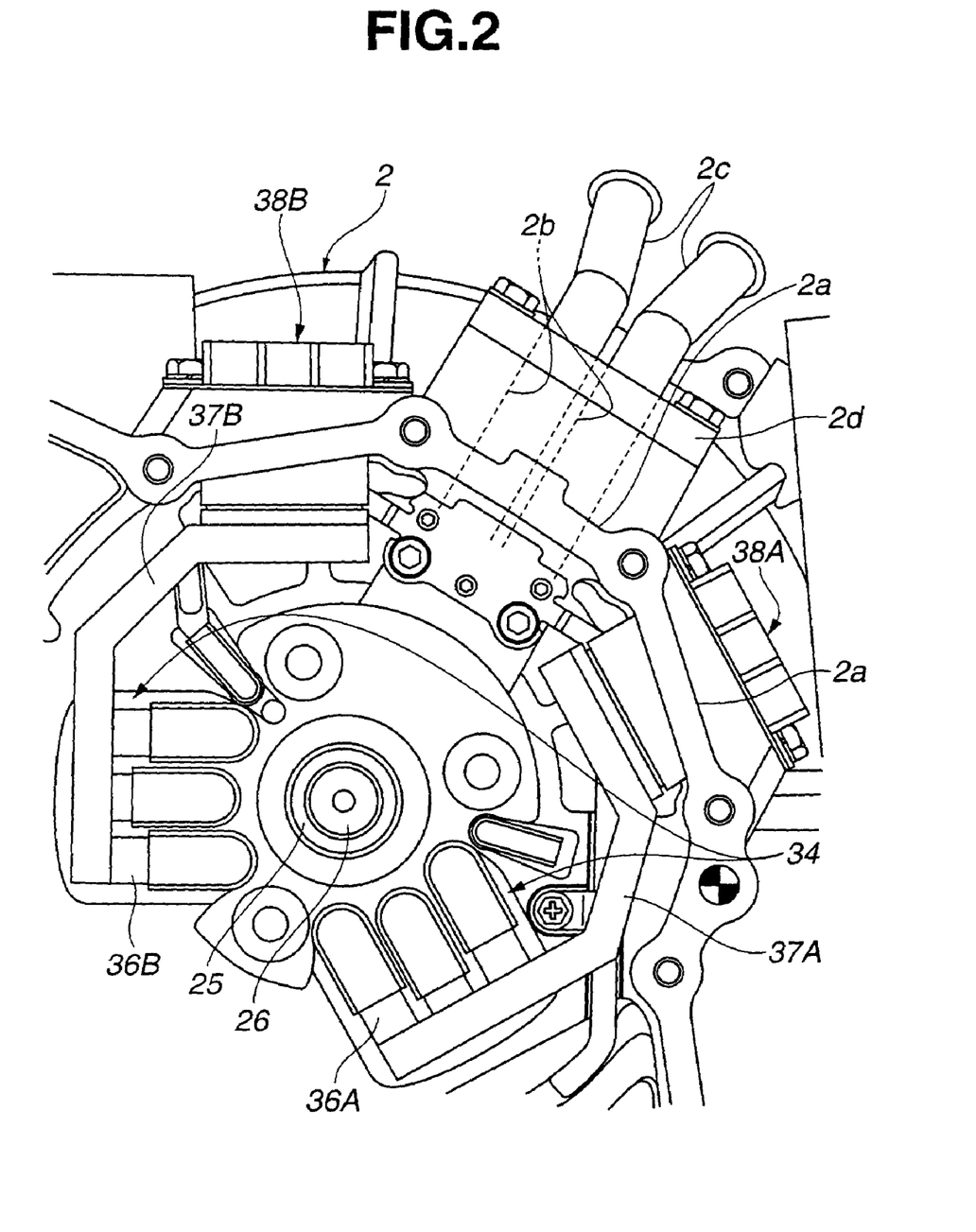
FIG. 2 is an enlarged inner view of a center housing part of the hybrid transmission of the present invention with an output gear removed, which is viewed from a first split section M1.
Figure 3:
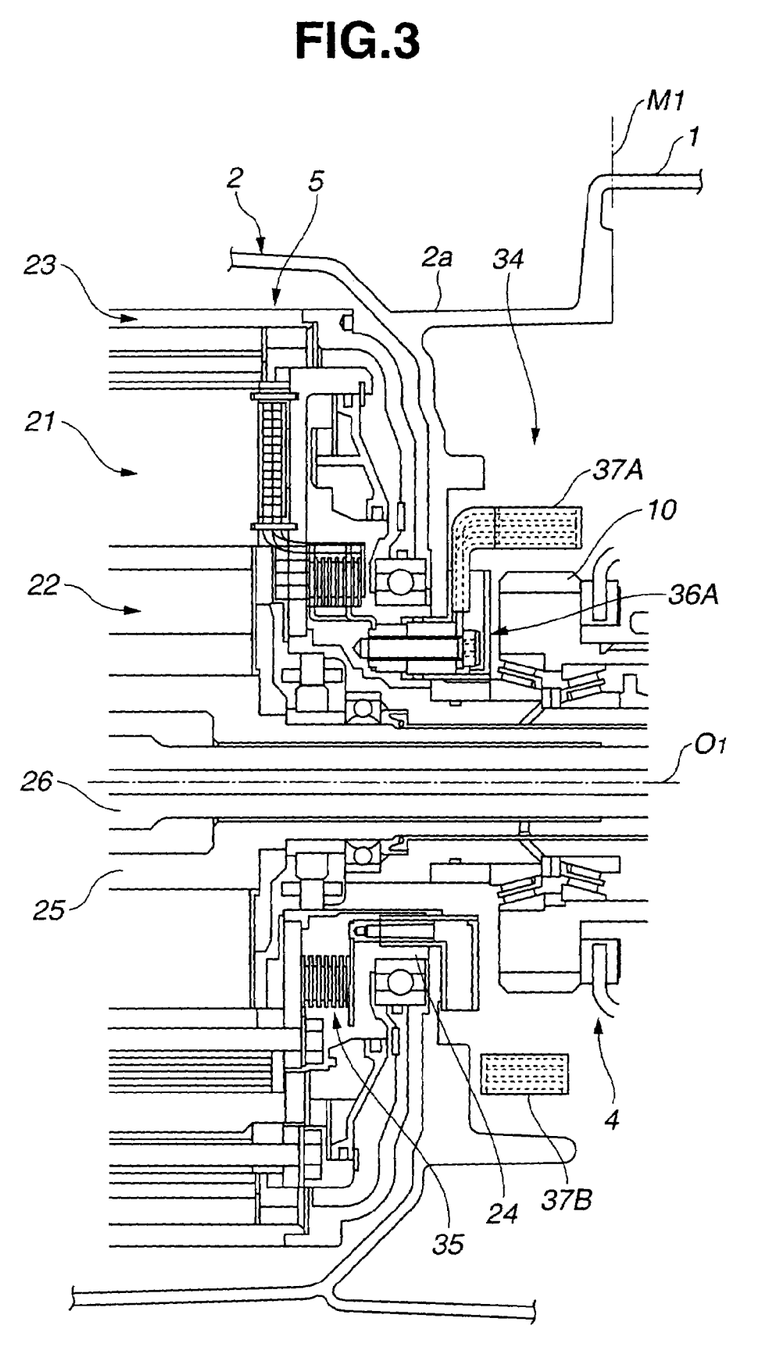
FIG. 3 is an enlarged axial sectional view of an essential part of the hybrid transmission of the present invention, which is taken along a plane that is different from that of FIG. 1.

The arrangement of various parts of the hybrid transmission 100 of the present invention will be more clearly understood from the following description that is made with the aid of FIGS. 2 and 3 in addition to FIG. 1.

FIG. 2 is a view of an inner portion of center housing part 2 taken from the position of first split section M1 with output gear 10 removed. FIG. 3 is an enlarged sectional view of an essential portion of the hybrid transmission of the present invention, taken along a plane that is different from that of FIG. 1.

As is seen from FIGS. 1 and 2, first split section M1 is positioned substantially between motor/generator unit 5 and differential speed change unit 4, the above-mentioned cooling water flow structure CWFS and wiring 34 are positioned also between motor/generator unit 5 and differential speed change unit 4, and these cooling water flow structure CWFS and wiring 34 are held by center housing part 2.

As is understood from the drawings, particularly FIGS. 1 and 2, wiring 34 of the electromagnets of annular stator 21 is led and exposed to the outside of the transmission housing from a diametrically reduced portion 2a of center housing part 2.

As is seen from FIG. 3, wiring 34 comprises an annular inner feeding unit 35 that is positioned near a right end of a center bore defined by annular stator 21. The unit 35 shown in the drawing is arranged concentric with common axis $O_1$. The unit 35 comprises a plurality of annular bus bars that are put on one another through respective insulators. The bus bars are connected to coils of the electromagnets of stator 21 through lead wires.

As is seen from FIG. 2, the wiring 34 further comprises two groups of power feeding units each including inner connectors 36A or 36B, an outer feeding cable 37A or 37B and an outer connector unit 38A or 38B which are connected in such a manner as will be described hereinnext.

Inner connectors 36A or 36B are mounted on bearing holder 24 and connected to the bus bars of the above-mentioned annular inner feeding unit 35 through respective wires. Outer feeding cable 37A or 37B comprises a plurality of flat bus bars that are put on one another through respective insulators. Inner connectors 36A or 36B are respectively connected to left ends of the bus bars of outer feeding cable 37A or 37B. Right ends of the bus bars of outer feeding cable 37A or 37B are connected to respective terminal ends of outer connector unit 38A or 38B. Each outer connector unit 38A or 38B is fixed to an aperture formed in a diametrically reduced portion 2a of center housing part 2. Thus, when predetermined two external plug units (not shown) are put into respective socket portions of outer connector units 38A and 38B from outside of transmission housing, electric connection between the coils of the stator 21 and an electric power source (not shown) becomes established.

As is seen from 2, cooling water passages 2b of the wall portion of center housing part 2 are led to respective outer tubes 2c that are connected to the diametrically reduced portion 2a of center housing part 2 by means of a connector 2d.

In the following, advantages of the present invention will be described.

As is described hereinabove, a so-called outer rotor assembly consisting of outer rotor 23, circular drive plate 27 and outer rotor shaft 26 is rotatably supported by the housing through three well-balanced holding means, which are bush 15 in first housing part 1, bearing 31 in second housing part 2 and bearing 28 in third housing part 3. Accordingly, rotation of the outer rotor assembly is stably carried out in the housing.

Furthermore, in the invention, a structurally larger part of the outer rotor assembly, which consists of outer rotor 23 and circular drive plate 27, is rotatably supported by two holding means which are bearing 28 and bearing 31, and a structurally smaller center part of the outer rotor assembly, which consists of outer rotor shaft 26, is rotatably supported by one holding means which is bush 15. That is, the structurally larger part including outer rotor 23 is rotatably supported by two supporters (28, 31) located at axially opposed portions of the larger part respectively, which means a highly reliable supporting of the outer rotor assembly, and the structurally smaller center part including outer rotor shaft 26 is rotatably supported by only one supporter (15) located at a leading end portion of the smaller center part, which means prevention of unnecessary increase in friction force applied thereto.

Cylindrical hub portion 27a of circular drive plate 27, which extends in the direction of the axis $O_1$, holds the left end portion of outer rotor shaft 26. This means that outer rotor shaft 26 is supported by two points, which are the hub portion 27a and bush 15. That is, outer rotor shaft 26 is stably supported in the housing.

As is described hereinabove, due to the zigzag structure of the radially inner part of circular drive plate 27, outer rotor shaft 26 is permitted to make a small swing about the axially left end thereof. That is, a so-called swing permission means is provided by the zigzag structure. Thus, even when outer rotor 23 or outer rotor shaft 26 is subjected to a tilting relative to the axis $O_1$ during rotation thereof, the swing permission means absorbs such tilting. Thus, application of an abnormal stress to the bearing portions for outer rotor 23 and outer rotor shaft 26 is suppressed.

Furthermore, due to provision of annular ridge 34A (see FIG. 4) on outer rotor shaft 26 in the above-mentioned manner, a so-called swing promotion means is provided by outer rotor shaft 26, which is assisted by the splined left end portion 26a of outer rotor shaft 26 and the O-ring 33. That is, a tilting movement of the longer right part of outer rotor shaft 26, which extends toward the differential speed change unit 4, is absorbed by the swing promotion means. Reduction in surface of the top of annular ridge 34A and rounded axial ends of annular ridge 34A promote the function of swing promotion means.

As is described hereinabove, the first split section M1 at which the housing is dividable into right housing part 1 and center housing part 2 is positioned between motor/generator unit 5 and differential speed change unit 4. Accordingly, in assembling process of the hybrid transmission 100 keeping right and center housing parts 1 and 2 uncoupled, the work for putting various parts of the units 4 and 5 into their given positions in right and center housing parts 1 and 2 is readily carried out.

Furthermore, as is described hereinabove, outer rotor shaft 26 is arranged to pass through hollow inner rotor shaft 25, and outer rotor 23 is connected to outer rotor shaft 26 through circular drive plate 27 which is positioned at one axial end of motor/generator unit 5 that is opposite to the other axial end that faces differential speed change unit 4, and wiring 34 of electromagnets of annular stator 21 is led to a right side of motor/generator unit 5 in FIG. 1 and led to the outside of the transmission housing from diametrically reduced portion 2a of center housing part 2 that is near the first split section M1. Thus, an axial length of the hybrid transmission 100 can be reduced because the housing has no need of providing any structure at its axial end through which wiring is led to the outside of the transmission housing. Furthermore, due to the close positioning between wiring 34 and first split section M1, the work for arranging and assembling wiring 34 in second housing part 2 is easily carried out. Furthermore, due to employment of the two groups of power feeding units, reduction in electric resistance of wiring 34 is expected.

Furthermore, due to provision of the diametrically reduced portion 2a of center housing part 2, an annular electric pump (not shown) which is to be disposed around center housing part 2 for pumping cooling water can be reduced in diameter, which promotes compactness of the hybrid transmission 100 of the invention. Operation of such electric pump is needed under a condition wherein motor/generator unit 5 is operated while the engine is at rest.

Since cooling water passages 2b defined by the wall portion of center housing part 2 terminate near the diametrically reduced portion 2a, the length of passages 2b can be reduced, which brings about a reduction in water flow resistance.

The entire contents of Japanese Patent Applications 2002-330830 (filed Nov. 14, 2002) and 2002-330799 (filed Nov. 14, 2002) are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A hybrid transmission comprising:
   a housing having a common axis defined thereby, the housing being adapted to be positioned beside an engine when the hybrid transmission is mounted on a motor vehicle;
   a differential speed change unit installed in the housing at a position near the engine and arranged coaxial with the common axis;
   a two-rotor type motor/generator unit installed in the housing at a position away from the engine and arranged coaxial with the common axis, the motor/generator unit having inner and outer rotors;
   an inner rotor shaft connected with the inner rotor to rotate therewith, the inner rotor shaft being hollow and coaxial with the common axis and extending to the differential speed change unit to be operatively connected to the same; and
   an outer rotor shaft rotatably received in the hollow inner rotor shaft and extending to the differential speed change unit to be operatively connected to the same, the outer rotor shaft being connected to the outer rotor through a circular drive plate which is positioned at one axial end of the motor/generator unit that is opposite to the other axial end that faces the differential speed change unit,
   wherein an outer rotor assembly comprising the outer rotor, the circular drive plate and the outer rotor shaft is rotatably supported in the housing by means of at least three supporting members,
   wherein the circular drive plate is formed at its diametrically center portion with a cylindrical hub portion in which an axial end portion of outer rotor shaft is concentrically received through a spline connection, and
   wherein the circular drive plate is formed near the cylindrical hub portion with a swing permission structure through which the outer rotor shaft is permitted to make a swing about the axially end portion thereof.

2. A hybrid transmission as claimed in claim 1, in which a structurally larger part of the outer rotor assembly which comprises the outer rotor and the circular drive plate is rotatably supported by two of the supporting members, and a structurally smaller center part of the outer rotor assembly which comprises the outer rotor shaft is rotatably supported by the remaining one of the supporting members.

3. A hybrid transmission as claimed in claim 1, in which the swing permission structure is possessed by a radially inner portion of the circular drive plate, the radially inner portion having a zigzag cross section.

4. A hybrid transmission as claimed in claim 1, in which the outer rotor shaft and the circular drive plate are arranged to have a swing promotion structure through which the swing movement of the outer rotor shaft is promoted.

5. A hybrid transmission as claimed in claim 4, in which the swing promotion structure comprises:
   an annular ridge formed about the axially end portion of outer rotor shaft, the annular ridge being in contact with an cylindrical wall of the cylindrical hub portion of the circular drive plate;
   an annular groove formed in and around the axially end portion of outer rotor shaft in the vicinity of the annular ridge; and
   an O-ring received in the annular groove.

6. A hybrid transmission comprising:
   a housing having a common axis defined thereby, the housing being adapted to be positioned beside an engine when the hybrid transmission is mounted on a motor vehicle;
   a differential speed change unit installed in the housing at a position near the engine and arranged coaxial with the common axis;
   a two-rotor type motor/generator unit installed in the housing at a position away from the engine and arranged coaxial with the common axis, the motor/generator unit having inner and outer rotors;
   an inner rotor shaft connected with the inner rotor to rotate therewith, the inner rotor shaft being hollow and coaxial with the common axis and extending to the differential speed change unit to be operatively connected to the same; and
   an outer rotor shaft rotatably received in the hollow inner rotor shaft and extending to the differential speed change unit to be operatively connected to the same, the outer rotor shaft being connected to the outer rotor through a circular drive plate which is positioned at one axial end of the motor/generator unit that is opposite to the other axial end that faces the differential speed change unit,
   wherein an outer rotor assembly comprising the outer rotor, the circular drive plate and the outer rotor shaft is rotatably supported in the housing by means of at least three supporting members;
   wherein the housing is provided with a diametrically reduced portion at a position between the differential speed change unit and the motor/generator unit, and in which a wiring from the motor/generator unit is exposed to a space between the motor/generator unit and the differential speed change unit and led and exposed to the outside of the housing through an opening formed in the diametrically reduced portion.

7. A hybrid transmission as claimed in claim 6, further comprising cooling water passages which are formed in a wall portion of the housing to let a cooling water flow therethrough for cooling a stator of the motor/generator unit.

8. A hybrid transmission as claimed in claim 7, in which the wall portion of the housing is provided with a bearing holder which has a center opening through which the inner and outer rotor shafts pass, and in which the stator of the motor/generator unit is fixed to the bearing holder.

9. A hybrid transmission as claimed in claim 8, in which the bearing holder has a cooling water passage that is merged with the cooling water passage of the wall portion of the housing.

10. A hybrid transmission comprising:
- a housing having a common axis defined thereby, the housing being adapted to be positioned beside an engine when the hybrid transmission is mounted on a motor vehicle, the housing having a diametrically reduced portion by which the housing is divided into a first housing part which is positioned near the engine and a second housing part which is positioned away from the engine;
- a differential speed change unit installed in the first housing part and arranged coaxial with the common axis;
- a two-rotor type motor/generator unit installed in the second housing part and arranged coaxial with the common axis, the motor/generator unit having inner and outer rotors and a wiring;
- an inner rotor shaft connected with the inner rotor to rotate therewith, the inner rotor shaft being hollow and coaxial with the common axis and extending to the differential speed change unit to be operatively connected to the same; and
- an outer rotor shaft rotatably received in the hollow inner rotor shaft and extending to the differential speed change unit to be operatively connected to the same, the outer rotor shaft being connected to the outer rotor through a circular drive plate which is positioned at one axial end of the motor/generator unit that is opposite to the other axial end that faces the differential speed change unit, wherein an outer rotor assembly comprising the outer rotor, the circular drive plate and the outer rotor shaft is rotatably supported in the housing by means of at least three supporting members, and wherein the wiring of the motor/generator unit is exposed to a space between the differential speed change unit and the motor/generator unit and led and exposed to the outside of the housing through an opening formed in the diametrically reduced portion of the housing.

* * * * *